Feb. 14, 1939. H. HASTINGS ET AL 2,147,031
GAUGE DAMPING CONSTRUCTION
Filed April 2, 1937
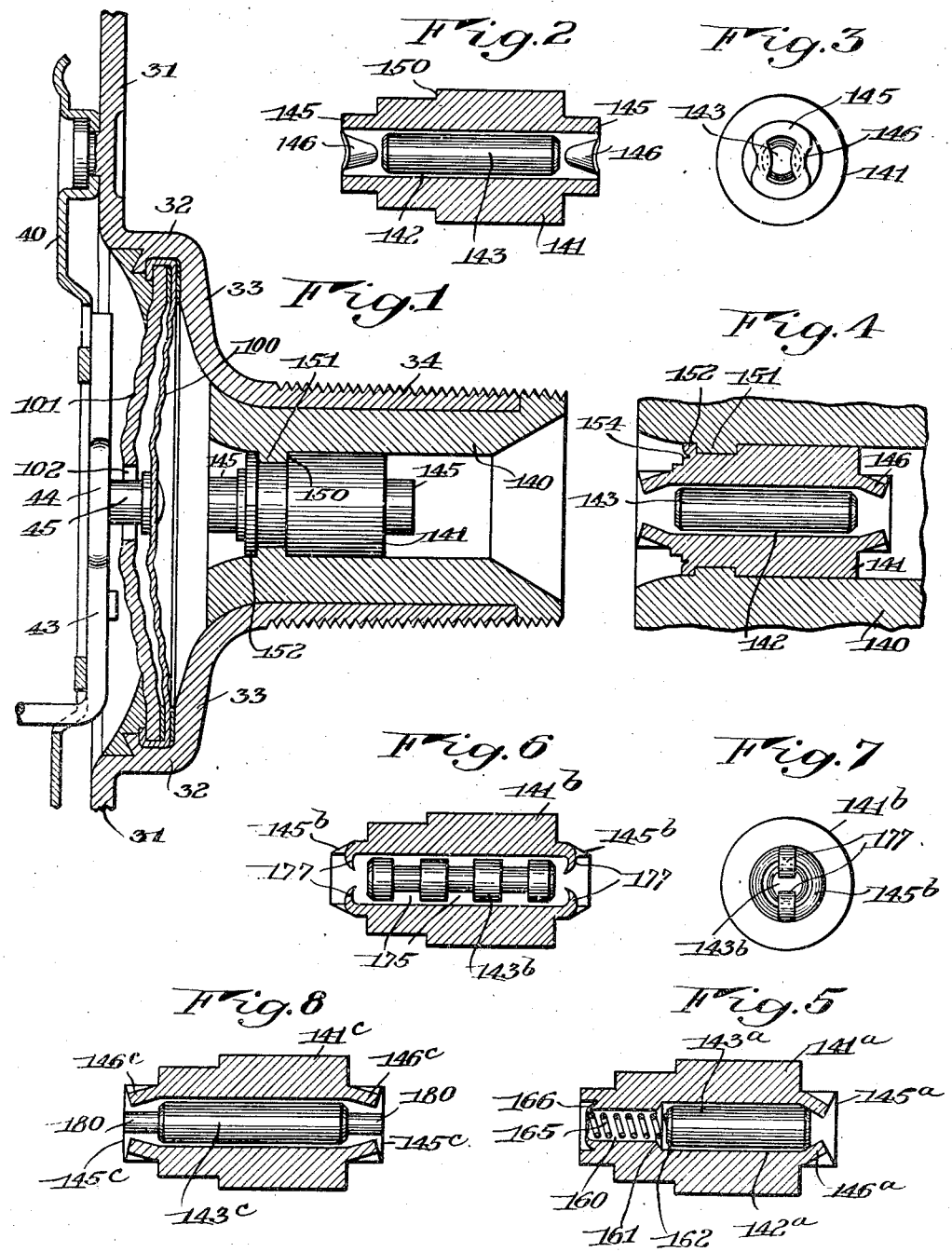
INVENTORS
Herbert Hastings
George H. Ford
BY Cumpston & Shepard
their ATTORNEYS Patented Feb. 14, 1939

2,147,031

UNITED STATES PATENT OFFICE 2,147,031

GAUGE DAMPING CONSTRUCTION

Herbert Hastings, Brighton, and George E. Ford, Rochester, N. Y., assignors to Rochester Manufacturing Co., Inc., Rochester, N. Y., a corporation of New York Application April 2, 1937, Serial No. 134,588

3 Claims. (Cl. 138—26)

This invention relates to a gauge, and more particularly to a pressure gauge, although some features of the invention are applicable also to gauges of other types.

An object of the invention is the provision of a generally improved and more satisfactory gauge, which may be constructed economically and quickly, which has few parts, and which is reliable in operation.

Another object is the provision of improved damping means for preventing violent fluctuations in a pressure gauge, and for preventing dirt from entering the diaphragm chamber.

A further object is the provision of damping means so designed and constructed that dirt getting into the damping means will not clog the damping means or render the gauge inoperative, and will tend to be worked loose by operation of the damping means.

To these and other ends the invention resides in certain improvements and combinations of parts, all as will be hereinafter more fully described, the novel features being pointed out in the claims at the end of the specification.

In the drawing:

Fig. 1 is a cross section taken centrally through such parts of the gauge as are necessary for an understanding of the present invention, showing the damping means in elevation;

Fig. 2 is a longitudinal section through a damping unit constructed in accordance with a preferred embodiment of the invention showing the unit before it is applied to the gauge;

Fig. 3 is an end view of the damping unit shown in Fig. 2;

Fig. 4 is a central longitudinal section through the damping unit showing it applied to the gauge;

Fig. 5 is a view similar to Fig. 2 showing a modified form of damping unit;

Fig. 6 is a similar view showing still another modified form of damping unit;

Fig. 7 is an end view of the construction shown in Fig. 6, and

Fig. 8 is a central section through still another modified form of damping unit.

The same reference numerals throughout the several views indicate the same parts.

The present application is a continuation in part of our copending application for patent on Gauge construction, Serial No. 84,662, filed June 11, 1936, now Patent 2,123,532, granted July 12, 1938. The present application is filed as a result of a requirement for division made by the Patent Office in said copending application.

The damping means constituting the subject matter of this present application may be applied to various kinds and types of gauges, particularly pressure gauges. It may be applied, for example, to a gauge including a casing having an annular rear wall 31, from which an annular flange 32 extends rearwardly to form a pocket for receiving a pressure responsive diaphragm and associated parts. At the rear edge of the portion 32 is an inwardly extending flange or wall 33 merging into a stem portion 34 threaded internally or externally, as desired, for connection to a conduit, tank or other suitable article subject to the pressure which the gauge is intended to indicate.

Mounted within the main chamber of the diaphragm casing is a mounting plate 40 on which part of the gauge operating mechanism is mounted. For example, this operating mechanism may include a shaft 43 bent to provide a crank portion 44 which overlies a stud 45 mounted on the pressure responsive diaphragm 100 and extending through an opening 102 in a diaphragm backing plate 101 positioned between the diaphragm and the shaft 43.

As the pressure to the right of the diaphragm 100 when viewed as in Fig. 1 increases or decreases, the pressure fluctuations cause corresponding movements of the central part of the diaphragm, thus causing the stud 45 to act upon the crank 44 to turn the shaft 43. The shaft is connected in any suitable manner to a hand or needle or other suitable indicating device movable with respect to a dial or scale, for example, all of which forms no part of the present invention.

It is desirable to provide various kinds of gauges, and particularly pressure gauges of the kind above outlined, with damping means to prevent too rapid movement of the pressure responsive diaphragm in case the pressure being measured by the gauge should fluctuate suddenly or violently. Satisfactory damping may be obtained by providing a connecting passage of very small cross sectional area between the pressure being measured and the diaphragm, so that this small section produces a throttling action. It has heretofore been proposed to provide one very small hole in a partition between the diaphragm chamber and the pressure being measured, in order to provide the desired throttling action, but experience shows that this is not satisfactory. The single small hole may easily become clogged by a single piece of foreign matter, such as dust.

To overcome the serious disadvantages of such previously proposed damping means the present invention provides an annular throttling opening between a fixed hollow cylindrical member and a piston, plunger, or plug movable longitudinally through this member. The plunger is of sufficient diameter so that pressure fluctuations will cause it to move longitudinally, and this longitudinal movement makes the annular spaces substantially self-clearing since a speck of dust or other foreign matter which becomes lodged between the plunger or plug and the surrounding cylinder is gradually worked loose by the movements of the plunger. Moreover, the fact that the throttling opening is annular makes it practically impossible to clog it by a single speck or even by several specks of foreign matter.

In the preferred construction, an adapter sleeve 140 is fixed within the stem 34 of the gauge, and within this sleeve is suitably fixed a second sleeve 141 of the damping unit, having a bore 142 therethrough. In the bore 142 is a cylindrical plunger or plug 143 of substantial diameter and of very slightly smaller size than the bore. In one construction which has been found quite satisfactory, the plunger 143 has a diameter of 0.073 inch, while the interior diameter of the bore 142 is 0.078 inch, thus leaving a total clearance of about 0.005 inch between the plunger and the surrounding wall.

The ends of the sleeve 141 are extended to form relatively thin bendable flanges 145, and these flanges are crimped inwardly as at 146 (Figs. 2, 3, and 4) preferably at two diametrically opposite points at each end of the damping unit, to limit the possible axial movement of the plunger 143. The flanges 145 are left uncrimped or undeformed around other sides of the perimeter of the bore, so that the plunger 143 does not act as a valve and never completely closes the passageway even when moved to one end or the other of its limited range of travel.

The sleeve 141 of the damping unit is preferably sealed tightly within the adapter sleeve 140 of the gauge, if such an adapter sleeve is employed, or tightly within the portion 34 of the gauge, if no adapter sleeve is used. The adapter sleeve 140, when employed, is sealed tightly within the casing portion 34 so that leakage can not occur between these parts. The damping unit sleeve 141 may have a shoulder 150 (Fig. 2) which lies against one side of an inwardly extending flange or rim 151 on the sleeve 140. On the other side of the flange 151, the metal of the sleeve 141 is deformed outwardly as at 152 (Fig. 4) by what may be termed a "staking" operation. For example, an annular tool with a sharp edge may be forced from left to right when viewed as in Figs. 1, 2, and 4, the annular tool being in axial alinement with the damping unit and having its sharp cutting edge of the diameter indicated by the cuts or nicks 154 in Fig. 4. As such a tool is forced rightwardly, it will cut an annular slice from the metal of the sleeve 141 and curve such slice outwardly into firm sealing contact with the sleeve 140, as shown at 152 in Fig. 4. This seals the connection between the sleeves 140 and 141 and prevents leakage between these parts.

If the pressure in the tank or conduit (hereafter called the line) to which the gauge is connected increases, a small amount of fluid, whether it be a gas or a liquid, will tend to flow leftwardly through the annular space between the plunger or pin 143 and the member 141, in order to increase the pressure in the diaphragm chamber between the diaphragm 100 and the damping device to the same extent as the increase in pressure in the line. If the pressure increase in the line is gradual, the flow of liquid past the plunger 143 will probably be sufficient so that the pressure in the diaphragm chamber keeps pace with that in the line. If the increase in line pressure be relatively sudden, the limited cross sectional area of the opening around the plug or plunger 143 will have a throttling effect reducing the flow of fluid past the plug so that the diaphragm is not suddenly subjected to the violent rise in pressure. If the rise in pressure is only momentary, the line pressure will probably fall again before the pressure within the diaphragm chamber has been built up to the maximum line pressure, and thus additional wild fluctuations of the diaphragm and its connected registering needle or hand will be avoided.

An alternative form of damping means is indicated in Fig. 5. Here, the sleeve 141a may correspond to the sleeve 141 above described and be similarly placed in the gauge stem. The bore 142a in this instance, however, does not extend entirely through the sleeve, but is connected at its inner end (that is, the end toward the pressure diaphragm) with a slightly smaller bore 160, leaving a conical seat 161 at the junction between the two bores. The end of the plunger or pin 143a is conically formed at 162 to fit within the seat 161 and act as a valve to close the opening. At the outer end of the pin 143a the extension 145a on the sleeve is crimped on two opposite sides as at 146a, in the same manner described in the previous embodiment, to prevent the pin from moving out of the sleeve. At the inner end of the pin is a spring 165 pressing at one end against the pin and normally tending to push the pin as far outwardly as is permitted by the crimped portions 146a. The opposite end of the spring 165 reacts against the lugs 166 bent inwardly from the end of the sleeve 141a.

Except for the differences above described, this form of damping unit may be the same as that previously described, and corresponding parts bear the same reference numerals used in describing the previous embodiment with the addition of the letter "a" to each numeral.

This construction is particularly useful where the pressure being measured is subject to sudden violent and temporary increases of great intensity which might injure the gauge mechanism, and which it is not necessary to register on the gauge. When such a sudden increase in the line pressure occurs, fluid can not flow past the plunger or pin 143 fast enough to equalize the pressure on both sides, and the suddenly increased pressure on the line side of the plunger moves the pin inwardly toward the diaphragm, compressing the light spring 165 until the end 162 of the pin seats against the valve seat 161. The pin then acts as a valve completely closing the passageway leading to the diaphragm chamber and preventing any further rise of the pressure within the chamber no matter how much the pressure in the line may rise. When the pressure in the line again falls to normal, the spring 165 presses the pin 143a away from the valve seat 161 and once more restores communication between the line and the diaphragm chamber. During normal slow fluctuations of pressure, the pin does not close the passageway, but acts merely as throttling means, and it is only during sudden and violent pressure fluctuations that the pin acts as a valve and cuts off communication.

Another alternative construction of damping means is indicated in Figs. 6 and 7. This construction employs a plunger, pin or plug 143b having a plurality of annular grooves 175 therein, three or more preferably being employed. The annular grooves have sharp outer corners and the grooves not only create eddy currents in the fluid flowing past the pin 143b, thus somewhat slowing up the flow of fluid, but also act as traps for receiving and holding any particles of foreign matter which may be entrained in the fluid. The eddy currents thus created in the fluid will produce an increase in the resistance to flow of the fluid so that when the annular grooves 175 are employed, the clearance between the plunger and the surrounding sleeve can be somewhat greater than if such annular grooves are not used, and yet in spite of this greater clearance the construction may have the same damping effect.

Figs. 6 and 7 also illustrate a modified form of means for limiting longitudinal movement of the plunger or plug of the damping unit, which motion limiting means can be used, if desired, in any of the other forms of construction, in place of crimping the side walls as at 146. In this modified construction, an angular shearing tool is used to shear and turn inwardly one or more sections from the annular end flanges 145b of the sleeve 141b, which cut section or sections are curved inwardly as indicated at 177 in Fig. 6, to form stops or abutments limiting movement of the plug or plunger 143b. Preferably two such sections are sheared and turned, at diametrically opposite points (as shown in Fig. 7) at each end of the sleeve 141b. As in the case of the crimped stops 146 (Figs. 2, 3, and 4) these stops 177 do not at any time close the passageway or cut off communication through the damping device, since they do not extend around the entire perimeter of the bore through the sleeve 141b, but occupy only a part of the perimeter as indicated in Fig. 7.

Except for the above described modifications, the construction in this embodiment of the invention may be the same as in the first embodiment above described, and corresponding parts in this embodiment bear the same reference numerals used in describing the first embodiment of the invention with the addition of the letter "b" to each numeral. As above indicated, it is a matter of choice whether the crimping means 146 or the bent ears 177 be used for limiting the movement of the plug or plunger in any of the embodiments of the invention, and either form of motion limiting means may be used with any of the different forms of plug.

Still another alternative construction is indicated in Fig. 8. Here the plug or plunger 143c is provided with pin-like extensions 180 at either one or preferably both of its ends, which extensions during the longitudinal movements of the plunger dislodge any foreign matter which may have accumulated in the space within the portions 145c of the plunger sleeve or bushing 141c. The extensions 180 are preferably of such size that they do not contact with the crimped portions 146c or with the inwardly bent lugs 177, whichever form of construction is used to restrain the pin 143c against excessive longitudinal movement. Thus the extensions 180 do not form bearings for the plunger but serve only as cleaning members, in the preferred form. If desired, however, this construction may be modified by making the extensions 180 bear upon the crimped portions 146c or the lugs 177, to center the plunger 143c within its sleeve 141c. Except for these extensions 180, this construction may be identical with the first form of damping construction above described, and corresponding parts bear the same reference numerals used in the first form of construction with the addition of the letter "c" to each numeral.

It is to be noted that in all embodiments of damping means above described, the plunger, pin, or plug is of relatively large diameter and has sufficient cross sectional area so that the fluid acts with substantial force against the pin and tends to move it longitudinally within its surrounding sleeve. The plunger, pin or plug is thus in effect a piston. This construction is to be distinguished from one employing a small wire of too small a diameter to act as a piston or to be moved longitudinally by the fluid pressure with any substantial degree of force.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. The combination with means forming a pressure chamber, of means including walls forming an inlet and outlet passageway communicating with said chamber, a member slidable longitudinally within said passageway, said member being of very slightly smaller cross sectional dimensions than those of said passageway to allow restricted communication through said passageway through the space between said member and the surrounding walls of the passageway, said member having a plurality of sharp cornered annular grooves formed around the periphery of said member at points spaced longitudinally thereof, said grooves serving to create eddy currents in fluid attempting to flow past said slidable member and serving to trap foreign matter entrained in such fluid, and means including constrictions in said passageway adjacent the ends of said member for limiting movement thereof in both directions along said passageway.

2. A pressure pulsation damping unit for insertion in a passageway leading to a pressure gauge, said unit including a sleeve having an exterior surface adapted to be tightly sealed within said passageway, a bore extending through said sleeve, a plunger of generally cylindrical shape mounted at least partially within said bore to move longitudinally therein, said plunger being imperforate and the maximum diameter thereof being of slightly smaller cross sectional size than the cross sectional size of said bore, to allow limited communication through said bore in the space around said plunger, the extreme portions of said plunger of said maximum diameter being separated from each other in a direction longitudinally of said plunger by a distance at least twice as great as said maximum diameter, and said plunger being of substantial cross sectional size so that it may act as a piston movable through said bore in response to differences in pressure on opposite sides of said plunger, the relative sizes of said plunger and said bore being such that the friction of longitudinal movement of said plunger in said bore and the friction of flow of fluid through said bore around said plunger produce a throttling and damping effect on pressure pulsations tending to pass along said bore, and abutment means limiting movement of said plunger in both directions in said bore to a range of movement of less than half the length of said plunger.

3. Means for damping fluctuations of fluid pressure, said means including walls forming a passageway having a portion of substantial length which is of substantially circular cross section and of substantially uniform diameter throughout said portion, said walls extending inwardly toward the central axis of said portion adjacent the ends of said portion, and an imperforate plug slidable longitudinally in said portion of said passageway, the range of longitudinal movement thereof being limited by said inwardly extending portions of said walls, said plug having a substantial length and being substantially cylindrical throughout at least a material part of said length and having a diameter very slightly less than that of said portion of said passageway and sufficiently great so that said fluctuations of fluid pressure will exert substantial longitudinal forces on said plug to tend to move it longitudinally within said passageway, the relative sizes of said plug and said passageway providing an approximately annular space of such minute size that the friction of longitudinal movement of said plug in said passageway and the friction of flow of fluid through said annular space between said plug and the surrounding wall of said passageway produce a throttling and damping effect on pressure pulsations attempting to pass along said passageway.

HERBERT HASTINGS.
GEORGE E. FORD.